United States Patent [19]

Woolcock

[11] 4,295,241
[45] Oct. 20, 1981

[54] PAINT ROLLER

[75] Inventor: Kenneth W. Woolcock, Rouse Hill, Australia

[73] Assignee: Rota Cota Pty. Ltd., New South Wales, Australia

[21] Appl. No.: 140,491

[22] Filed: Apr. 15, 1980

[51] Int. Cl.³ .............................................. B05C 17/02
[52] U.S. Cl. .................................. 15/230.11; 29/110.5
[58] Field of Search .................... 15/230.11; 29/110.5, 29/116 R; 101/328, 329, 330, 331; 401/197, 208

[56] References Cited

U.S. PATENT DOCUMENTS 3,119,137  1/1964  Schueler ............................ 15/230.11
3,986,226 10/1976  Roe et al. .......................... 15/230.11

FOREIGN PATENT DOCUMENTS 2272851 12/1975  France ............................... 15/230.11
548283   9/1956  Italy ................................... 15/230.11
778665   7/1957  United Kingdom .

Primary Examiner—Chris K. Moore
Attorney, Agent, or Firm—Holman & Stern

[57] ABSTRACT

A paint roller of the kind consisting of a handle having an axle attached to it the axle extending at right angles to the axis of the handle in which there is a rotatable end cap at each end of the axle onto which a base tube can be fitted by being slid over the caps so as to be a frictional fit thereon. Means are provided at each end of the axle to maintain the end caps on the axle and the caps are maintained in a spaced apart relation by a tubular member surrounding the major part of the axle and the tubular member is maintained in concentric relationship with the end caps. Preferably each end cap has a skirt on which are a plurality of, preferably four, circumferentially spaced ribs which coact with the base tube to distort the cap and to a certain extent the base tube so as to bring the base tube into contact with the cap in the areas between the ribs.

4 Claims, 2 Drawing Figures

PAINT ROLLER

BRIEF SUMMARY OF THE INVENTION

The present invention relates to a paint roller of the kind consisting of a handle, a rod projecting from the handle and having on it means for rotatably supporting a paint roller cover, the axis of which is at right angles to the axis of the handle.

Paint rollers of the kind set forth are well known and constructed in a variety of different forms. Considerable effort and ingenuity has been devoted to the design of paint rollers so that, while functioning well and having an acceptable working life, the manufacturing costs are kept to a minimum.

The object of the present invention is to provide a form of construction for a paint roller which achieves these objectives.

A paint roller according to the invention consists in a handle, the handle being attached to an axle, the axle extending at right angles to the axis of the handle and extending approximately symmetrically on either side thereof, there being arranged at each end of the axle a rotatable end cap, the end caps being adapted to receive and support between them the base tube of a paint roller cover, the base tube being a frictional fit on said end caps the construction being such as to permit easy fitting or removal of the tube while holding the tube firmly and ensuring that the tube and end caps rotate together, means being provided at each end of the axle to maintain the end caps on the axle, the end caps being maintained in a spaced apart relation by a tubular member surrounding the major part of the axle, means being provided at each end of the tubular member to maintain it in concentric relationship with the end caps.

BRIEF DESCRIPTION OF THE DRAWINGS

In order that the invention may be better understood a preferred form thereof is shown by way of example in the accompanying drawings in which.

DETAILED DESCRIPTION

Figure 1:
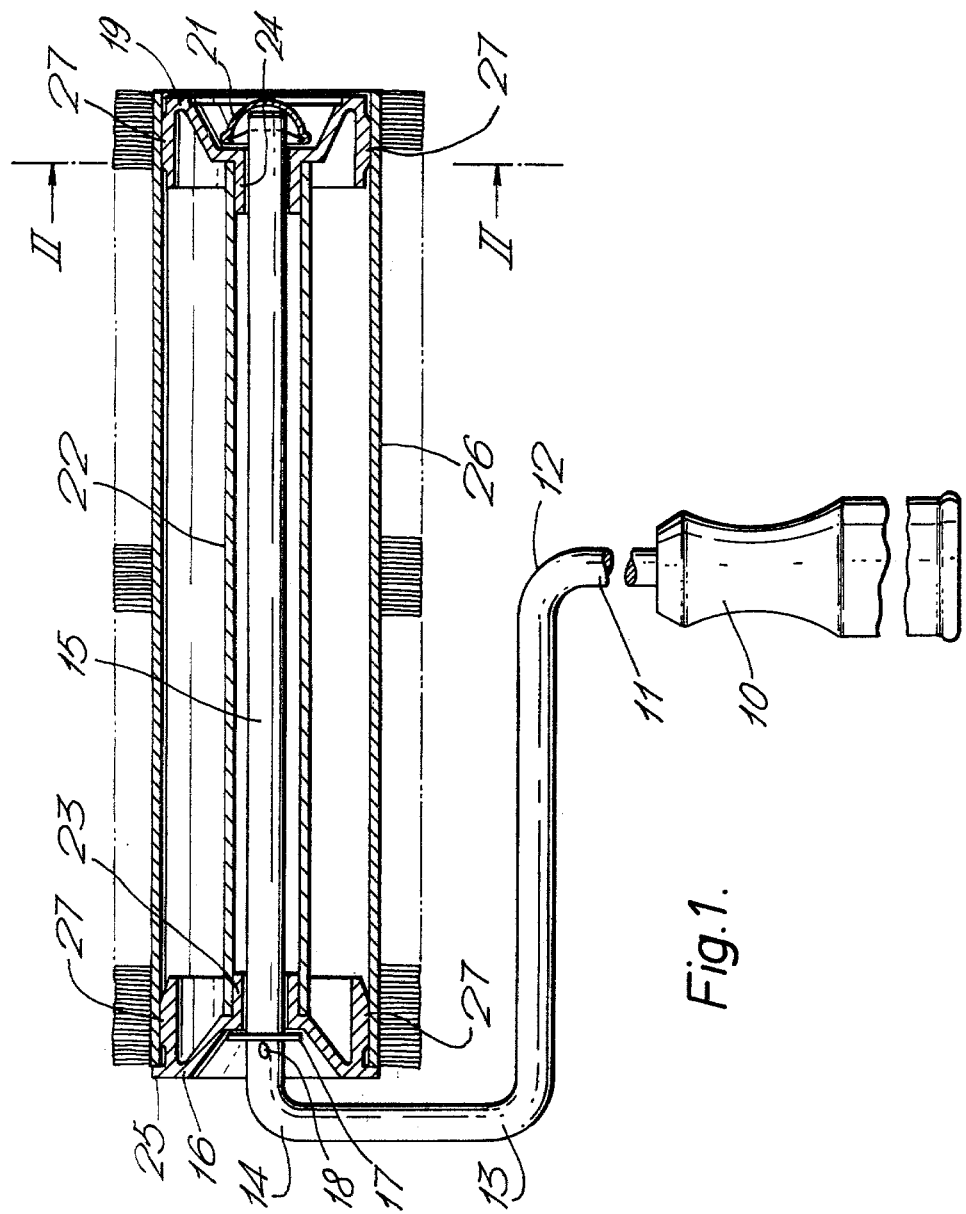
FIG. 1 is an elevation of a paint roller according to the invention, the paint roller being shown in cross section and, FIG. 2 is a cross-sectional view on line II—II of FIG. 1 to an enlarged scale.

The paint roller consists of a handle 10 of conventional form from which a steel rod 11 projects in an axial direction. This rod is bent three times at right angles at 12, 13 and 14 and ends in an axle 15 which lies at right angles to the axis of the handle 10 and which is arranged substantially symmetrically on either side of that axis.

The axle 15 carries at its closed end, that is the end adjacent the right angle bend 14, a first end cap 16 which is freely rotatable on the rod and which is maintained in position by means of the washer 17 abutting against a "pinch" 18 in the rod 15. At its free end the rod 15 supports a second end cap 19 which is rotatable on it and which is held in position by a "push nut" 20 type of spring clip, the spring jaws of which engage a preformed groove 21 near the end of the rod 15.

The end caps 16 and 19 are maintained in a spaced apart relationship by means of the tubular member 22 which is maintained in a concentric relation with the end caps by fitting over spigot portions 23 and 24 of the end caps. The tubular member 22 is preferably formed by moulding from plastic material as are the end caps 16 and 19.

Figure 2:
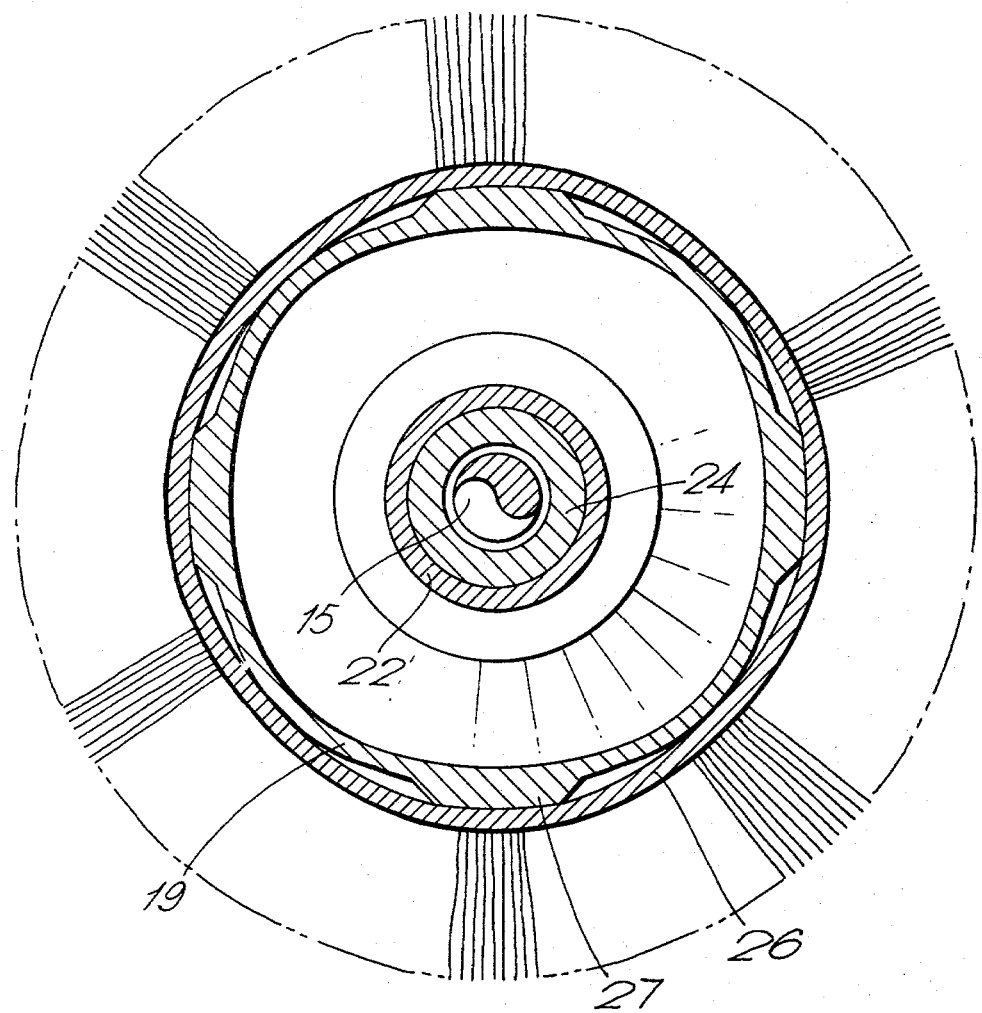

The end caps 16 and 19 are the same except for the fact that the end cap 16 is provided with a peripheral flange 25 which acts as a stop for the base tube 26 of a paint roller cover. This flange is absent from end cap 19. Each end cap is provided with four circumferentially spaced longitudinal ribs 27 located on its skirt. These are dimensioned so as to achieve an interference fit in the base tube 26. By proper choice of dimensions and materials of the respective parts, when a base tube is installed on a roller assembly, slight distortion occurs in the skirt of the end cap to an eight lobed shape and the base tube to also distort slightly to a four cornered shape so that the peripheral area between adjacent ribs on the skirt of an end cap makes contact with the inside surface of the base tube in addition to the rib area and there is thus frictional contact in eight rather than four places. This feature is shown in FIG. 2.

The paint roller cover may be readily removed from the paint roller by sliding it off over the end cap 19 and replaced in an opposite manner.

The construction described above has been found to function satisfactorily and is particularly economic to manufacture.

In particular the invention offers a very secure means of affixing the base tube to the paint roller frame by providing for an interference fit of the tube over each end cap, in which the continuous circumferential skirt construction provides hoop stressed control to its flexibility. That is to say because the ribbed skirt of the end cap has a continuous circumferential construction it acts as a hoop in compression to give controlled flexibility and thus multiple frictional contact with the tube.

The construction described above has been found superior to other plastic and metal holding systems that require longitudinal pieces to give an interference fit in the center of the cover but are relatively free at each end and is also superior to systems that rely on a segmented or castellated construction of the end cap skirt where interference depends on cantilever controlled flexibility of each segment. The construction allows the cover to be easily removed and replaced without having to unscrew and remove an end cap as is the case with some types of paint roller. Finally the construction according to the invention can be made to accomodate a variety of paint roller covers of different lengths by the use of an appropriate axle. With fully moulded metal types of paint rollers a separate moulding or pressing is required for each roller size.

I claim:

1. A paint roller comprising a handle, an axle attached to said handle extending at right angles to the axis of the handle and approximately symmetrically on either side thereof, rotatable plastic end caps mounted on the axle ends having outer cylindrical sections to receive and support the base tube of a paint roller cover in the inner surface thereof, a plurality of circumferentially spaced external longitudinal ribs on said cylindrical sections, said ribs functioning when a base tube is pushed over said end caps to distort said outer cylindrical sections of said end caps so that said ribs are deflected inwardly and the mid areas of said cylindrical sections between each pair of ribs are deflected outwardly to contact the inner surface of said base tube, thereby increasing the rigidity of said ribs already in contact with the said inner surface and enabling a base tube having manufacturing tolerance variations of its inner diameter to have a frictional fit on a major part of each outer cylindrical section of said end caps while being held firmly and ensuring that the base tube and end caps rotate together and at the same time permitting easy installation and removal of the base tube, and means at each end of the axle to retain said end caps on said axle, said end caps constituting the only connection between the base tube and the axle.

2. A paint roller as claimed in claim 1 and further comprising inner cylindrical sections on said end caps and a tubular member surrounding the axle and engaging said inner cylindrical sections to maintain said end caps in a spaced apart relationship.

3. A paint roller as claimed in claim 1 or 2 wherein four of said ribs are arranged symmetrically on each end cap.

4. A paint roller as claimed in claim 1 or 2 wherein said base tube is sufficiently flexible to distort slightly and contributes to the contact between said tube and said end caps in said areas between adjacent ribs.

* * * * *